(12) United States Patent
Iwakura et al.

(10) Patent No.: US 7,167,383 B2
(45) Date of Patent: Jan. 23, 2007

(54) STEP-UP/DOWN VOLTAGE CHOPPER

(75) Inventors: Tesshi Iwakura, Kanagawa (JP); Shinichi Deguchi, Kanagawa (JP)

(73) Assignees: Kyosan Electric Mfg., Co. Ltd., Kanagawa (JP); Nissan Motor Co., Ltd., Kanagawa (JP)

( * ) Notice: Subject to any disclaimer, the term of this patent is extended or adjusted under 35 U.S.C. 154(b) by 41 days.

(21) Appl. No.: 11/165,417

(22) Filed: Jun. 23, 2005

(65) Prior Publication Data
US 2006/0018138 A1   Jan. 26, 2006

(30) Foreign Application Priority Data
Jul. 21, 2004   (JP)   ............ 2004-213069

(51) Int. Cl.
*H02M 7/04* (2006.01)
(52) U.S. Cl. .............. 363/89; 363/16; 363/65; 323/271; 323/225
(58) Field of Classification Search .......... 363/16–20, 363/37, 65, 97, 24, 25, 71, 89; 323/222, 323/271, 225, 282, 267, 224
See application file for complete search history.

(56) References Cited
U.S. PATENT DOCUMENTS 5,038,267 A * 8/1991 De Doncker et al. ......... 363/89
6,051,961 A * 4/2000 Jang et al. .................. 323/224
6,232,752 B1 * 5/2001 Bissell ....................... 323/225
6,294,900 B1 * 9/2001 Greenwood et al. ........ 323/222
6,320,358 B1 * 11/2001 Miller ........................ 323/222

* cited by examiner

*Primary Examiner*—Rajnikant B. Patel
(74) *Attorney, Agent, or Firm*—Straub & Pokotylo; John C. Pokotylo

(57) ABSTRACT

A series circuit of a first main transistor 4 and a first main diode 6 is connected across a DC input voltage source 1, and a filter capacitor 13 and a series circuit of a second main diode 12 and a second main transistor 8 are connected in parallel with the output load side. A filter reactor 7 is connected between the juncture of the first main transistor 4 and the first main diode 6 in the series circuit and the juncture between the second main diode 12 and the second main transistor 8 in the series circuit. Resonant capacitors 5 and 9 in effect are connected across the collector-emitter path of the first and second main transistors 4 and 8, respectively. In operations other than that with small load current, when the first and second main transistors 4 and 8 are turned off, the collector currents therefrom are caused to flow to the resonant capacitors 5 and 9, respectively, thus obtaining soft switching. In the small load operation with a pulse width less than that in the neighborhood of the resonant time, instead of the on-off operation of the first or second main transistor, hard switching is made with a first auxiliary transistor 2 at the step-down time and with a second auxiliary transistor 11 at the step-down time.

8 Claims, 8 Drawing Sheets

STEP-UP/DOWN VOLTAGE CHOPPER

BACKGROUND OF THE INVENTION

This application claims benefit of Japanese Patent Application No. 2004-213069 filed on Jul. 21, 2004, the contents of which are incorporated by the reference.

The present invention relates to step-up/down voltage choppers and, more particularly, to a step-up/down voltage chopper, which executes soft switching for reducing switching loss in operation other than that with small load and executes hard switching in the heavy load operation.

As this type of step-up/down voltage chopper, an edge resonant step-down voltage chopper is used. A resonant type circuit, on the other hand, executes pulse frequency control with a constant "on" or "off" time interval. This circuit, however, has a drawback that it is subject to efficiency deterioration in low frequency operations with low control rates. Also, for executing the resonant operation it is necessary to increase the resonant current compared to the load current in the zero current switching system, while in the zero voltage switching system the resonant voltage with respect to the DC input voltage is increased. Therefore, the circuit has a drawback that the main circuit device has a high rating compared to the circuit rating.

As a circuit for precluding this drawback, an edge resonant system has been proposed, which utilizes resonant operation only at the turn-on and -off edges of the main circuit device (see literature "The Journal of the Institute of Power Electronics", Vol. 29, No. 1, 2004.2).

FIG. 4 shows this type of edge resonant step-down voltage chopper, and FIG. 5 shows an operation time chart of the same.

In the edge resonant circuit shown in FIG. 4, a main transistor Qs and a resonant capacitor Cr are connected in parallel, and a resonant reactor $L_r$ is connected for resonance with an auxiliary arm constituted by an auxiliary transistor Qa and an auxiliary diode Da and the main transistor Qs.

FIG. 5 shows currents and voltages in the circuit shown in FIG. 4, i.e., base signal $I_{Ba}$ in the auxiliary transistor Qa, resonant reactor current $I_{Lr}$, resonant capacitor voltage $V_{Cr}$, base signal $I_{Bs}$ of the main transistor Qs, corrector current $I_{SC}$ of the main transistor Qs, current $I_{Df}$ of a flywheel diode Df, filter reactor current $I_{Lf}$, and corrector current $I_{Qa}$ of the auxiliary transistor Qa.

When the main transistor Qs is "off", the resonant capacitor Cr is charged to DC input voltage Ei. Before the main transistor Qs is turned on, the auxiliary transistor Qa is turned on by supplying $I_{Ba}$, thus causing discharge of the resonant capacitor Cr through the resonant reactor $L_r$. When the voltage $V_{cr}$ across the resonant capacitor Cr becomes zero, the resonant current continuously flows through an inverse conduction diode Ds inversely parallel with the main transistor Qs. At this time, the main transistor Qs is turned on to bring about a zero voltage switching operation. This system is called ZVT (Zero Voltage Transition) system.

When the auxiliary transistor Qa is turned on after turning-on of the main transistor Qs, the resonant reactor current $I_{Lr}$ flows through the auxiliary diode Da and the inverse conduction diode Ds to the DC input voltage side. The operation of the auxiliary transistor Qa at this time is a hard switching operation.

When the main transistor Qs is turned off, the resonant capacitor Cr connected between the two terminals of the main transistor Qs is charged from zero voltage. Zero voltage switching of the main transistor Qs is thus obtained FIG. 6 shows auxiliary transistor base signal $I_{Ba}$, main transistor base signal $I_{Bs}$, resonant current and resonant capacitor voltage $V_{cr}$ for describing the relation between the pulse width control range and the edge resonance. The edge resonant circuit utilizes a resonant phenomenon when the main transistor Qs is turned on and off. For this reason, the pulse width control of the main transistor Qs can not be obtained during the resonant operation time.

Generally, denoting the pulse width control range by T, the restriction at the turn-on time by $T_{on}$, the restriction at the turn-off time by $T_{off}$, the possible pulse width control range Tc is given as $$Tc = T - (T_{on} + T_{off})$$

The above edge resonant system, however, has the following drawbacks.
(1) Many circuit elements are involved.
(2) The control circuit is complicated.
(3) The auxiliary transistor is turned off in hard switching.
(4) The possible pulse width control range is restricted by the frequency of the resonant circuit. (The control rnage is narrow).

Furthermore, the edge resonant step-up voltage chopper is constituted by basic elements like those of the edge resonant step-down voltage chopper. The main transistor Qs and the resonant capacitor Cr are connected in parallel, and the resonant reactor Lr is connected for resonance with the auxiliary arm constituted by the auxiliary transistor Qa and the auxiliary diode Da and the main transistor Qs.

FIG. 7 shows an example of the edge resonant step-up voltage chopper, and FIG. 8 shows the operation time chart of the same.

In the edge resonant circuit shown in FIG. 7, a main transistor Qs and a resonant capacitor Cr are connected in parallel, and a resonant reactor $L_r$ is connected for resonance with an auxiliary arm constituted by an auxiliary transistor Qa and an auxiliary diode Da and the main transistor Qs. Detailed description in connection with FIGS. 7 and 8 is not given because it is the same as described above.

In the switching in the edge resonant circuit described above, restriction is imposed on the control width at the PWM control time. In the PWM control, duty operation from 0 to 100% is theoretically possible. In the edge resonant operation, however, the edges of the pulse switching waveform are in resonance caused by the auxiliary circuit, and it is impossible to obtain PWM control of the resonant time.

In the actual circuit operation, as in the hard switching PWM control, the edges involve non-usable times due to the on-off characteristics used in the device used for the switching. In the case of the edge resonance, however, edge resonant sections non-usable for the PWM control are present, which is about 3 to 10 times those in the hard switching case.

The edge resonance circuit has another drawback that in low PWM control range regions resonant circuit loss, generated due to edge resonance and hard switching loss generation in the switching device for the edge resonance, increases the circuit loss due to edge resonance and deteriorates the efficiency.

SUMMARY OF THE INVENTION

An object of the present invention is to provide a step-up/down circuit capable of setting a wide PWM control range and can ensuring high efficiency even in narrow PWM control ranges.

According to an aspect of the present invention, there is provided a step-up/down voltage chopper having a first series circuit of a first main transistor and a first main diode, which is connected across a DC input voltage circuit, a filter capacitor and a second series circuit of a second main diode and a second main transistor, which is also connected across an output load side and a filter reactor, which is connected between the juncture between the first main transistor and the first main diode in the first series circuit and the juncture between the second main diode and the second main transistor in the second series circuit, wherein: a first and a second resonant capacitor in effect are connected between the collector and the emitter of the first and second main transistors, respectively, and in operation other than that with a small load current the first and second main transistors are turned off with the collector current therein caused to flow through the first and second resonant capacitor, respectively, for soft switching.

In operation other than that with small load current the first or second resonant capacitor is discharged, and at the instant when the charge in the first or second resonant capacitor becomes zero, the first or second main transistor is turned on for zero voltage switching. In operation other than that with small load current, in the step-up/down operation immediately before the first main transistor is turned on the first resonant capacitor is discharged, and at the instant when the first resonant capacitor charge becomes zero the first main transistor is turned on f or zero voltage switching; and in step-up voltage operation the second main diode current flowing through a filter capacitor connected in parallel with the load is once turned off with the first main transistor, immediately before turning on the second main transistor the second and first resonant capacitors are discharged, and at the instant when the charges in the second and first resonant capacitors become zero the first and second main transistors are turned on.

According to another aspect of the present invention, there is provided a step-up/down voltage chopper, wherein: a first series circuit having a first main transistor and a first main diode and a second series circuit having a first auxiliary circuit and a first auxiliary diode are connected in parallel with a DC input voltage circuit, a first resonant reactor is connected between the juncture between the first main transistor and the first main diode in the first series circuit and the juncture between the first auxiliary transistor and the first auxiliary diode in the second series circuit, and a first resonant capacitor and a first inversely conductive diode are connected between the collector and the emitter of the first main transistor; a third series circuit having a second main diode and a second main transistor and a fourth series circuit having a second auxiliary diode and a second auxiliary transistor are connected in parallel with a filter capacitor which is connected in parallel with the load, and a second resonant reactor is connected between the juncture between the second main diode and the second main transistor in the first series circuit and the juncture between the second auxiliary diode and the second auxiliary transistor in the second series circuit; a second resonant capacitor and a second inversely conductive diode are connected between the collector and the emitter of the second main transistor; and a filter reactor is connected between the juncture of the first main transistor and the first main diode in the third series circuit and the juncture between the second main diode and the second main transistor in the fourth series circuit.

In operation other than that with small load current the first and second main transistors are turned off with execution of a soft switching operation based on zero voltage switching caused with the a shift of the collector currents to the first and second resonant capacitors, respectively. In operation other than that with small load current the first resonant capacitor is discharged by turning on the first auxiliary transistor, and at the instant when the charge in the first auxiliary transistor becomes zero the first main transistor is turned on for zero voltage switching. In operation other than with small load current at the stepping-up voltage operation the current flowing into the filter capacitor is once turned off with the first main transistor by zero voltage switching, and right before turning on the first and second main transistors the first and second auxiliary transistors are turned on to make the charges in the first and second resonant capacitors zero before turning on the first and second main transistors for zero voltage, zero current switching. In operation other than that with small load the step-down voltage operation is executed with on-off operation of the first auxiliary transistor for hard switching, and the step-up voltage operation is executed with on-off operation of the second auxiliary transistor for hard switching.

Other objects and features will be clarified from the following description with reference to attached drawings.

PREFERRED EMBODIMENTS OF THE INVENTION

Preferred embodiments of the present invention will now be described with reference to the drawings.

Figure 1:
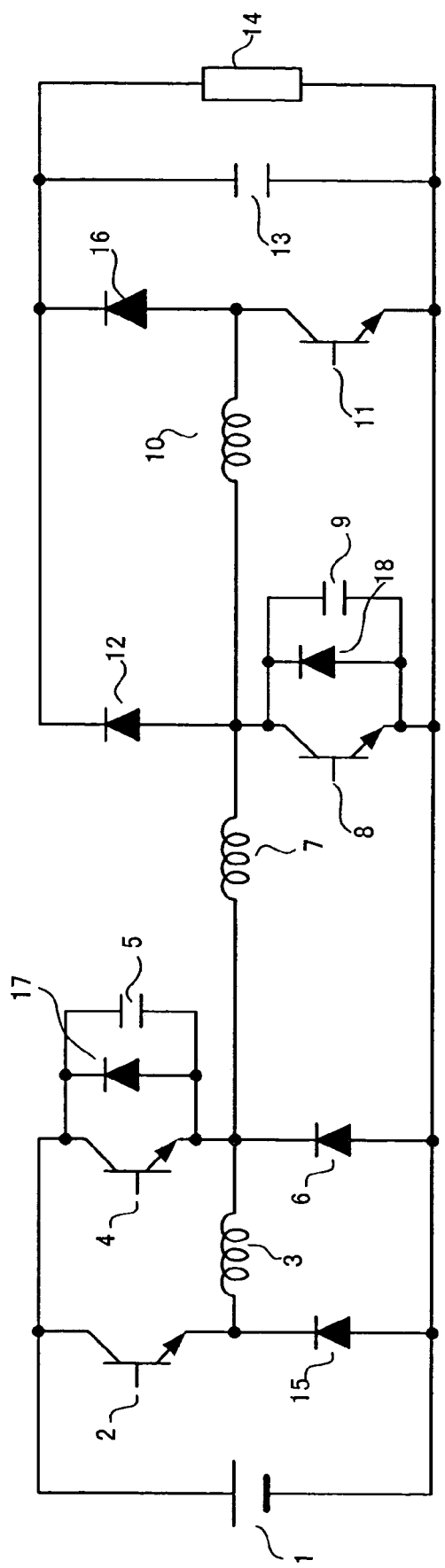
FIG. 1 is a circuit diagram showing an embodiment of the step-up/down voltage chopper according to the present invention.
Figure 2:
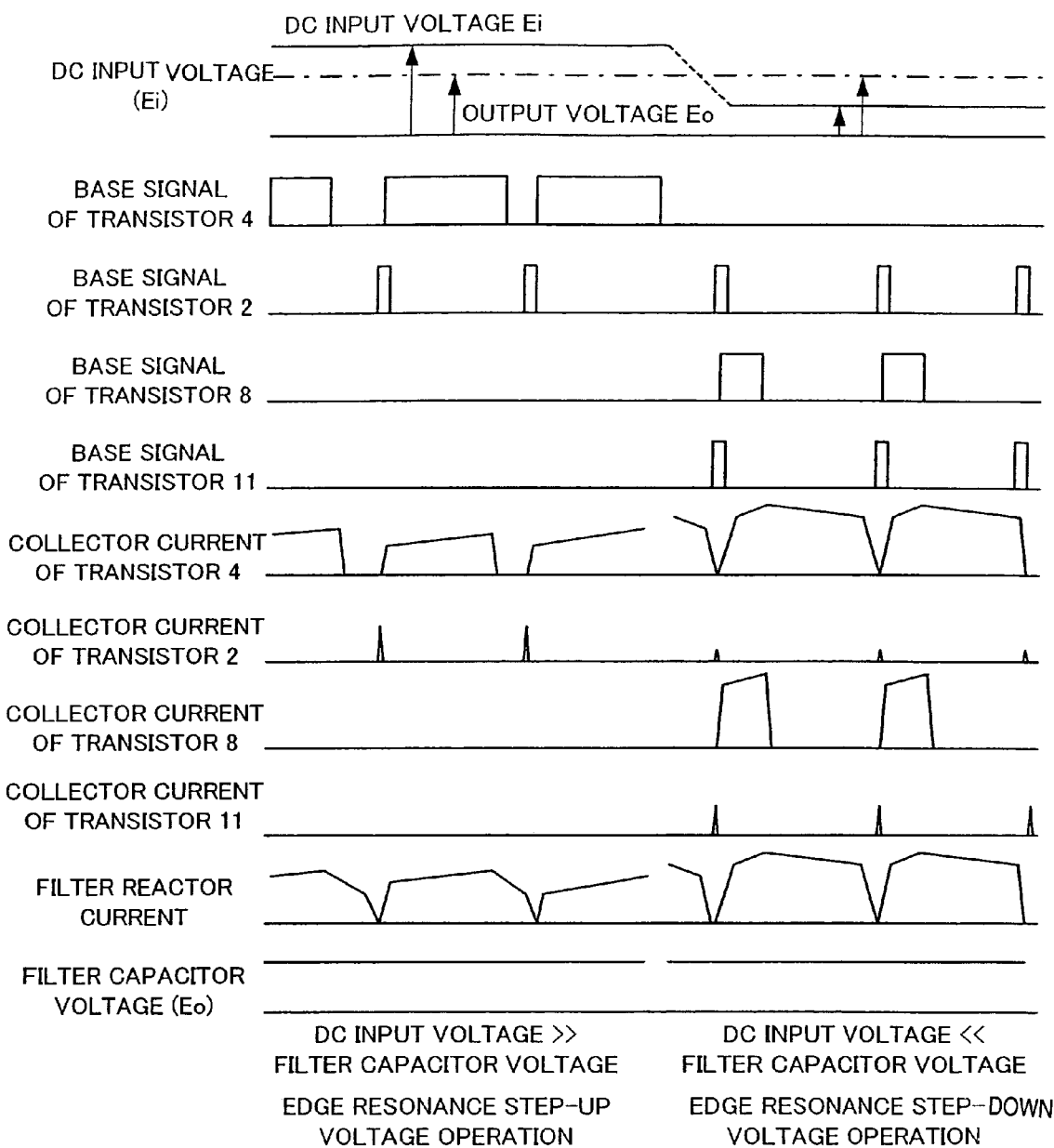
FIG. 2 is a view showing signal waveforms in various parts of the step-up/down voltage chopper shown in FIG. 1.
Figure 3:
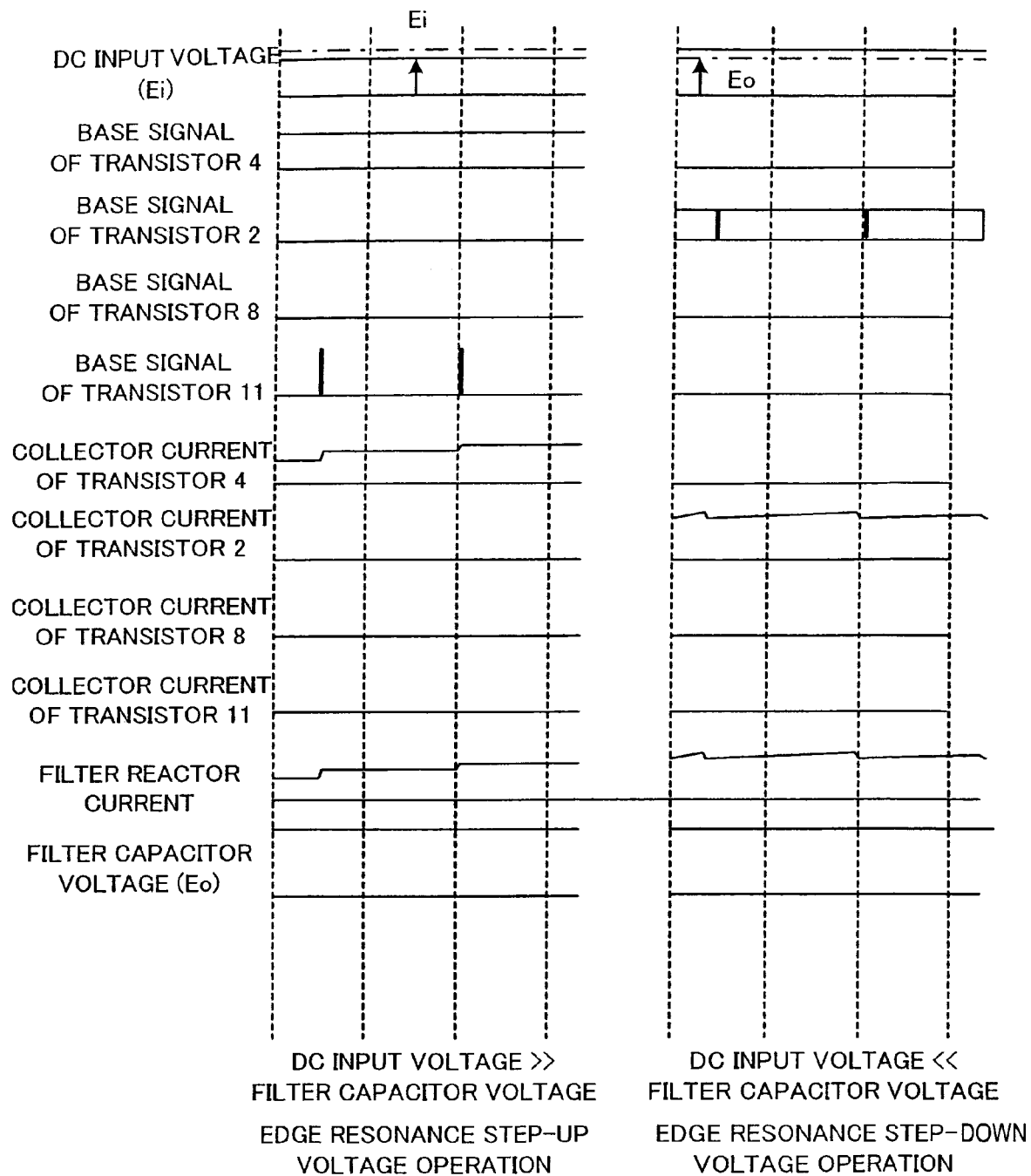
FIG. 3 is a timing chart showing signals in various parts in the auxiliary circuit operation FIG. 1.
Figure 4:
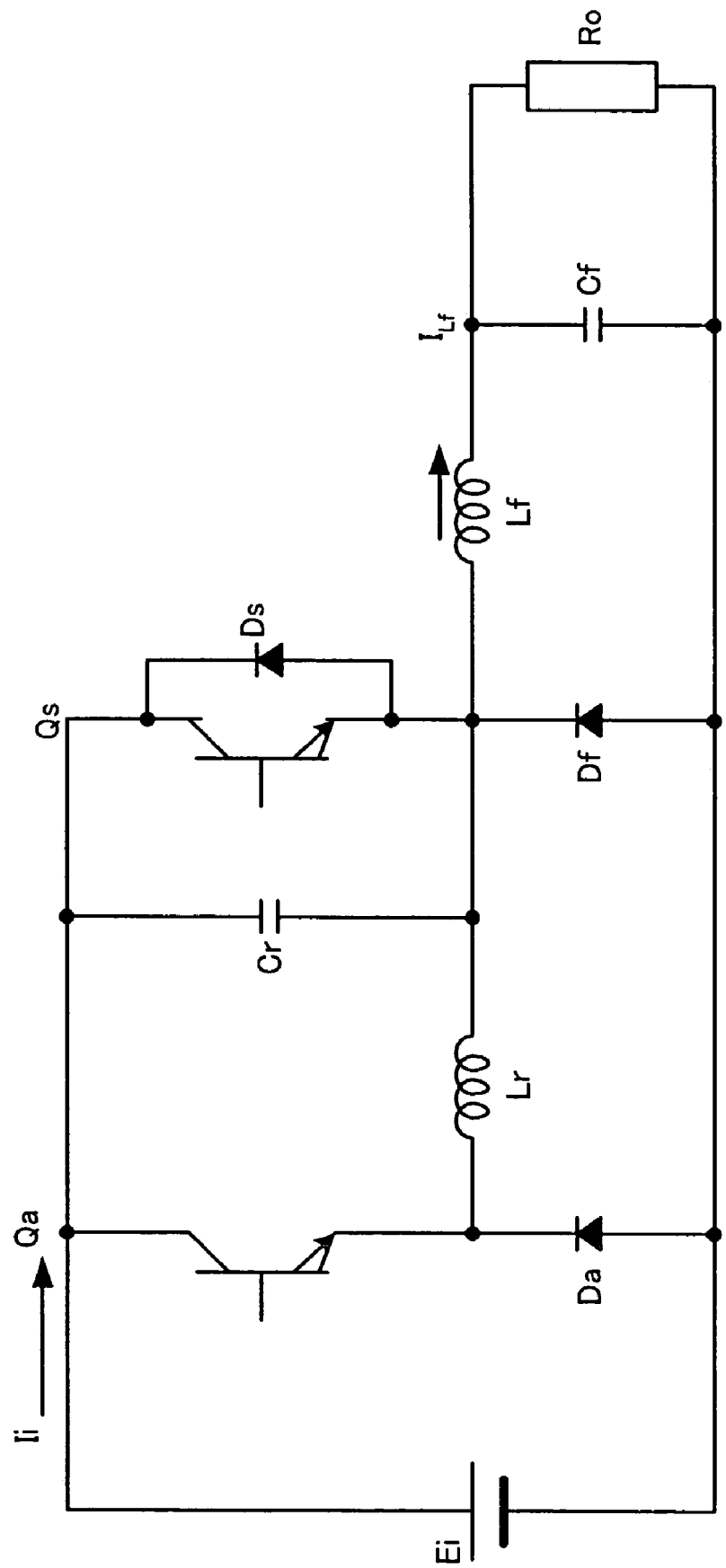
FIG. 4 shows a prior art edge resonant step-down voltage chopper circuit.
Figure 5:
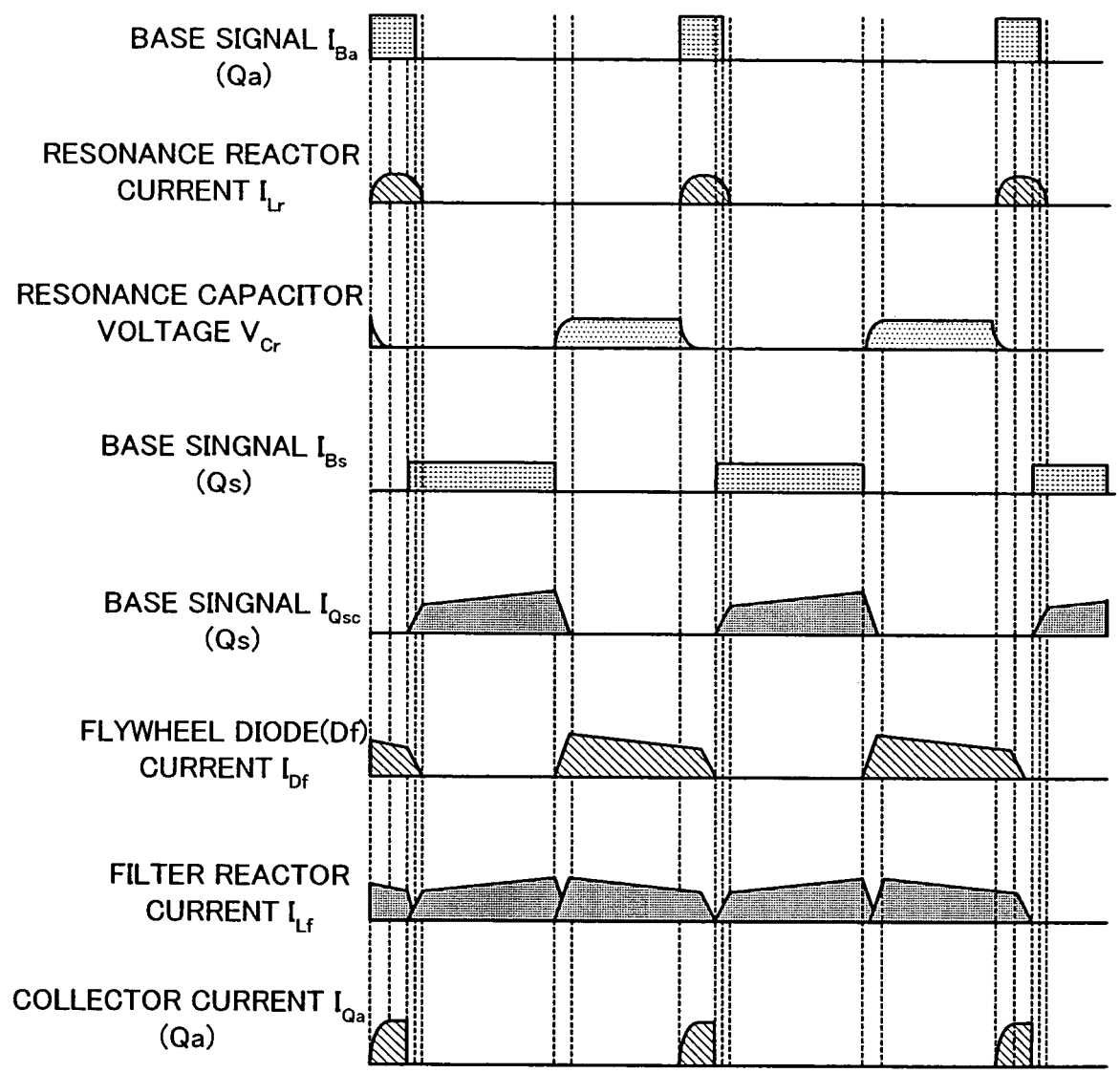
FIG. 5 shows an operation time chart of the edge resonant step-down voltage chopper shown in FIG. 4.
Figure 6:
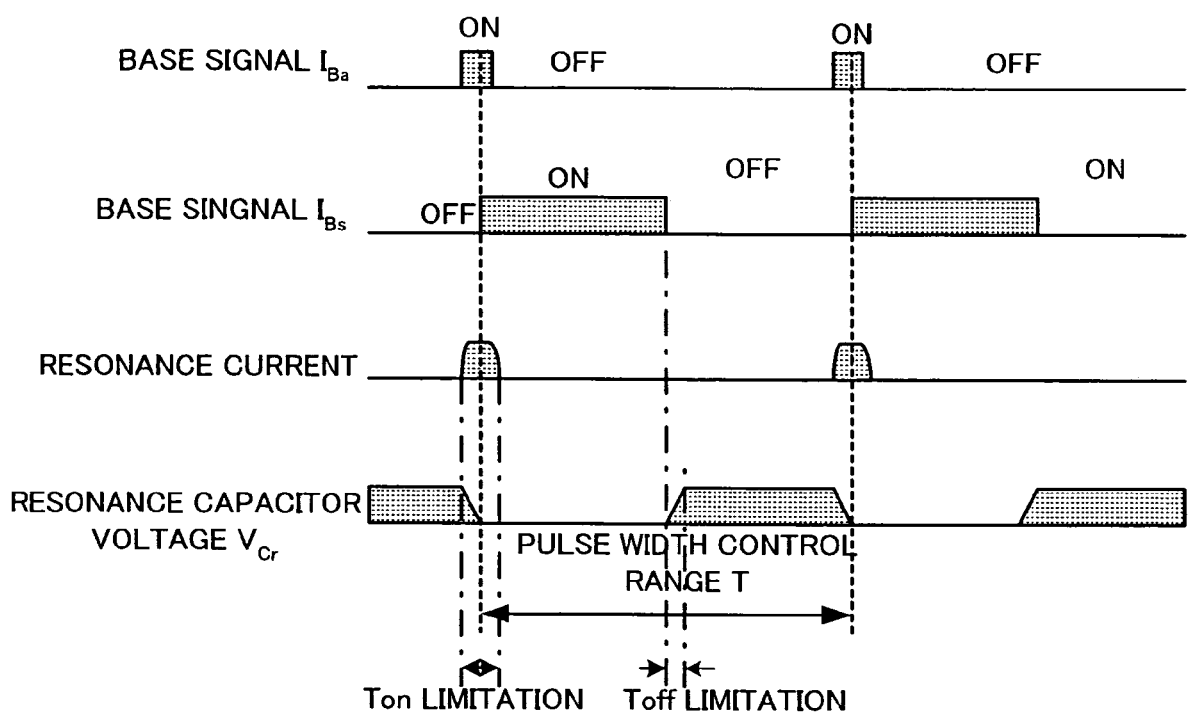
FIG. 6 shows relationship between the pulse width range and edge resonance of the circuit shown in FIG. 4.
Figure 7:
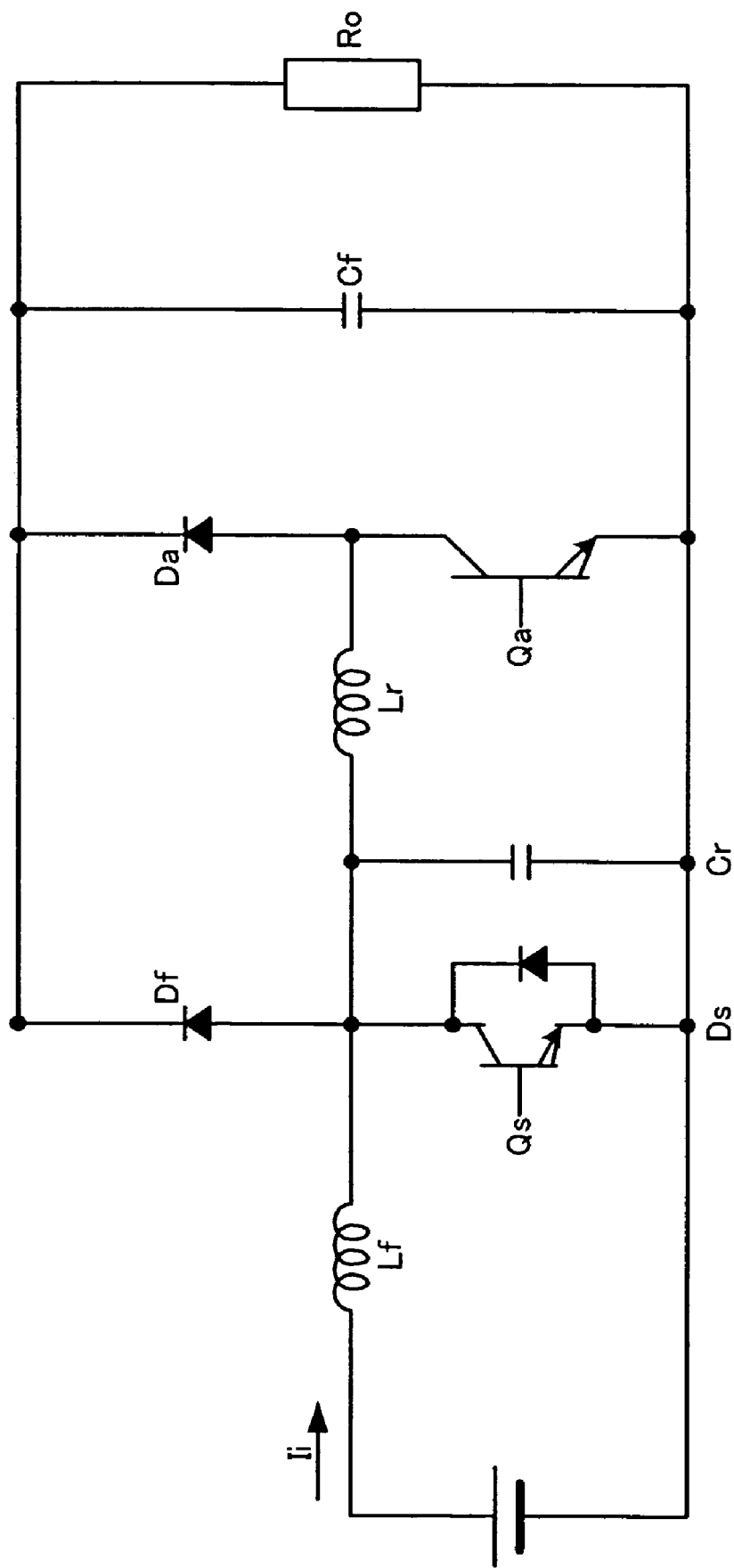
FIG. 7 shows an example of a prior art edge resonant step-up voltage chopper.
Figure 8:
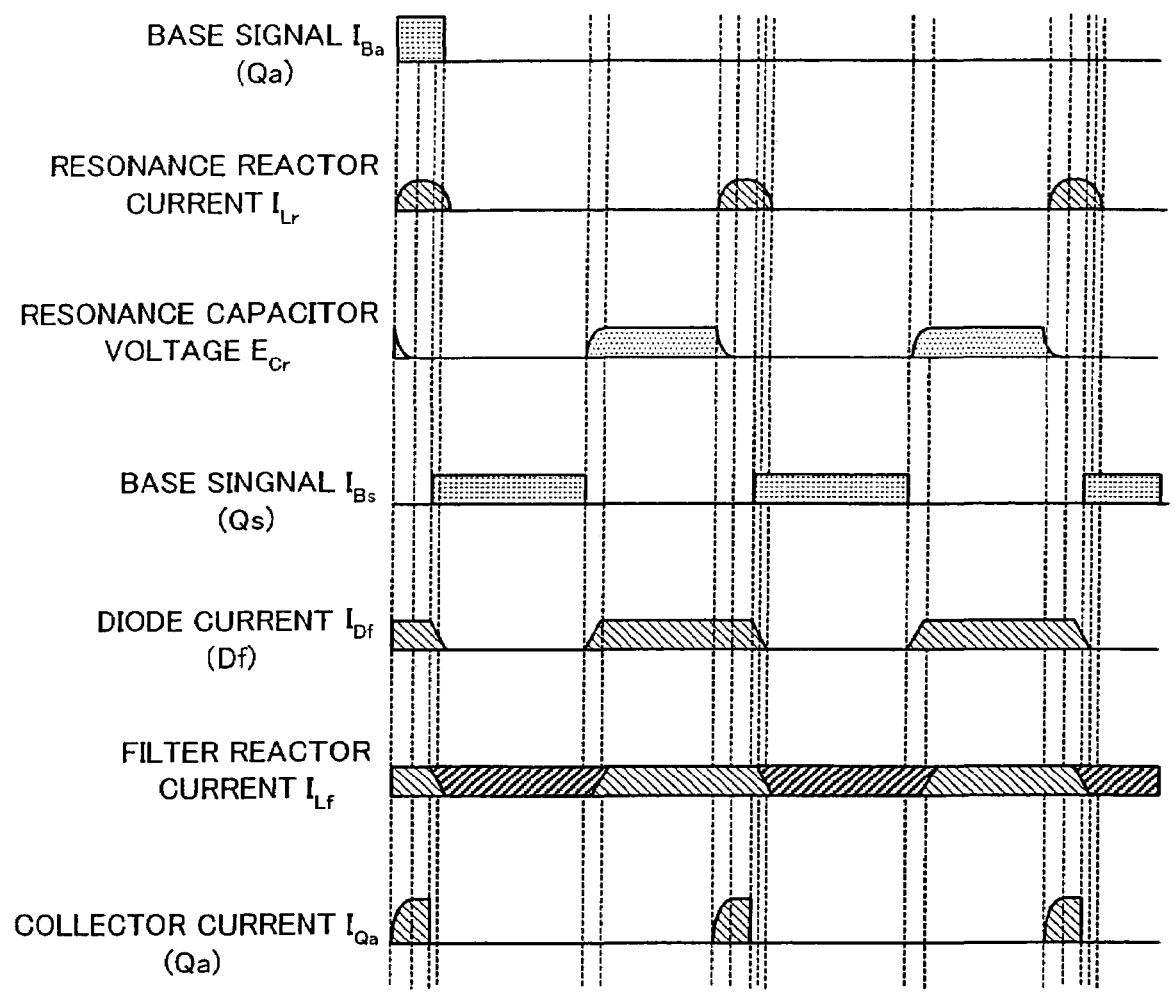
FIG. 8 shows the operation time chart of the circuit shown in FIG. 7.

FIG. 1 is a circuit diagram showing an embodiment of the step-up/down voltage chopper according to the present invention. FIG. 2 is a view showing signal waveforms in various parts of the step-up/down voltage chopper shown in FIG. 1 for describing the operation of the same. FIG. 3 is a timing chart showing signals in various parts in the auxiliary circuit operation.

The normal operation of the step-up/down circuit shown in FIG. 1 will now be described as step-up and -down voltage operations.

In the step-down voltage operation, a first main transistor 4 is turned on and off for control, and in the step-down voltage operation the sole first main transistor 4 is operated. The operation contents are the same as the usual edge resonant step-up voltage chopper operation.

More specifically, soft switching is brought about by a first auxiliary transistor 2 with edge resonance provided by a first resonant capacitor 5 connected across the collector-emitter path of the first main transistor 4. When the first main transistor 4 is turned on, the first auxiliary transistor 2 is turned on to cause the resonance with a first resonant reactor 3 and the first resonant capacitor 5 for resonant capacitor discharge. At the instant when the resonant capacitor discharge is brought to zero, the first main transistor 4 is turned on. Zero voltage switching is thus obtained.

When the first main transistor 4 is turned off, the collector current in the first main transistor 4 flows into the first resonant capacitor 5 since the charge of the first resonant capacitor 5 is zero. Thus, the zero voltage switching is obtained.

In the step-up voltage operation, a second main transistor 8 is turned on and off for control. In this operation, however, the second main transistor 8 is not operated solely, but also the first main transistor 4 is operated. More specifically, when the second main transistor 8 is turned on, the first main transistor 4 is "on", and current is flowing through a second main diode 12 to a filter reactor 7. The turning-on of the second transistor 8 at this time, results in switching loss generation. For the soft switching, the first main transistor 4 is turned off immediately before the turning-on of the second main transistor 8. Since the charge in the first resonant capacitor 5 is zero, the collector current from the first main transistor 4 flows into the first resonant capacitor 5. Zero voltage switching is thus obtained.

At this time, the current in the filter reactor 7 becomes tentatively zero. Subsequently, the first and second auxiliary transistors 2 and 11 are turned on to bring about resonant operation Of the first and second resonant capacitors 3 and 10 with the discharges of the first and second resonant capacitors 5 and 8 connected to the first and second main transistors 4 and 8, respectively. At the instant when the charges in the first and second resonant capacitors become zero, the first and second main transistors 4 and 8 are turned on. Thus, the zero voltage switching is obtained. A first and a second inversely conductive diode 17 and 18 are connected in parallel with the first and second transistors 4 and 8, respectively.

In this embodiment of the step-up/down voltage chopper, the operation of the edge resonant step-up/down voltage chopper is changed as follows.

In the operation other than that with small load current, the step-up/down voltage chopper is in soft switching operation utilizing the edge resonance. When a small load current operation comes up, the step-up/down voltage chopper does hard switching operation under PWM control, thus preventing PWM control range enlargement and small load current operation efficiency reduction. Besides, the hard switching operation is performed by auxiliary transistor on-off operation instead of main transistor on-off operation. At this time, the resonant reactor is used in a state that it is in series with the filter reactor. In the small load operation, the operation is equivalently the same as operation with an increased reactance.

In the operation other than that with small load current, the auxiliary circuit for edge resonance executes the operation of the prior art circuit. However, the pulse width under PWM control is reduced at times of less up-down voltages, i.e., at times of small ratios between the input and output voltages. At such times, in a small load state with less load current the pulse width is further reduced. In the edge resonant circuit system, as described above, it is impossible to obtain control of the resonant parts.

With reduced pulse width, according to the present invention, the minimum pulse width required for executing the edge resonant operation is detected, and the prior art hard switching is performed with the auxiliary switch for operation with a pulse width less than the limit value.

In the step-down voltage operation, with the usual operation range the control is based on the on-off operation of the first main transistor 4. The first main transistor 4 is solely operated at the step-down voltage operation. The operation contents are the same as the usual edge resonant step-down voltage chopper operation. Specifically, for soft switching the first auxiliary transistor 2 provides for the edge resonance with the first resonant capacitor 5 connected across the collector-emitter path of the first main transistor 4. When the first main transistor 4 is turned on, the first auxiliary transistor 2 is turned on to discharge the first resonant capacitor 5 with resonance provided by the first resonant reactor 3 and the fist resonant capacitor 5. When the resonant capacitor charge becomes zero, the first main transistor 4 is turned on. Zero voltage switching is thus obtained.

Since the charge in the first resonant capacitor 5 is zero, the turning-on of the first main transistor 4 causes the collector current to flow from the first main transistor 4 into the first resonant capacitor 5. Thus, the zero voltage switching is obtained.

When the pulse width is reduced to reach the minimum pulse width necessary for the edge resonant operation, the first main transistor 4 stops the operation. When providing for the operation with a pulse width less than the limit value, the operation is of hard switching provided by the first auxiliary transistor 2. At this time, the first resonant reactor 3 and the filter reactor 7 provide a series operation, and energy stored in each reactor flows into the filter capacitor 13.

In the step-up voltage operation, control is made with on-off operation of the second main transistor 8. Also, in the step-up voltage operation the second main transistor 8 is not solely in operation, but also the first main transistor 4 is in operation. More specifically, when the second main transistor 8 is turned on, the first main transistor 4 is "on", and current flows through the second main diode 12 into the filter reactor 7. At this time, the turning-on of the second main transistor 8 results in switching loss generation.

For soft switching, the first main transistor 4 is turned on immediately before the second main transistor 8 is turned on. Since the charge in the first resonant capacitor 5 is zero, the collector current from the first main transistor 4 flows into the first resonant capacitor 5. The first main transistor 4 is thus operated by zero voltage switching. At this time, the current in the filter reactor 7 transiently becomes zero. Subsequently, the first and second auxiliary transistors 2 and 11 are turned on, and the charges stored in the first and second capacitors 5 and 9 connected to the first and second main transistors 4 and 8, respectively, are brought to resonance with the first and second resonant reactors 3 and 10, respectively. When the charges in the first and second resonant capacitors 3 and 9 become zero, the first and second main transistors 4 and 8 are turned on. Thus, zero voltage switching is obtained.

In the step-up voltage operation, when the pulse width is reduced to reach the minimum pulse width necessary for the edge resonant operation, the first and second main transistors 4 and 8 stop their operations. When providing for the operation with a pulse width less than the limit pulse width, the operation is of hard switching provided by the second auxiliary transistor 11. At this time, the second resonant reactor 10 and the filter reactor 7 are in series operation, and the energy stored in each reactor flows into the filter capacitor 13. In the above way, in the small load current operation the step-up/down voltage chopper is performing hard switching operation making use of the auxiliary switch.

As has been made obvious from the above description of operation, according to the present invention no resonant operation is brought about in the small load operation, at which the pulse width is reduced. Also, the auxiliary transistors are in hard switching operation, and the load current is reduced. Because of the switching in this state, compared to the case of operation with edge resonance, it is possible to reduce current and thus reduce the switching loss.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A step-up/down voltage chopper having a first series circuit of a first main transistor and a first main diode, which is connected across a DC input voltage circuit, a filter capacitor and a second series circuit of a second main diode and a second main transistor, which is also connected across an output load side and a filter reactor, which is connected between the juncture between the first main transistor and the first main diode in the first series circuit and the juncture between the second main diode and the second main transistor in the second series circuit, wherein:
   a first and a second resonant capacitor in effect are connected between the collector and the emitter of the first and second main transistors, respectively, and in operation other than that with a small load current the first and second main transistors are turned off with the collector current therein caused to flow through the first and second resonant capacitor, respectively, for soft switching.

2. The step-up/down voltage chopper according to claim 1, wherein:
   in operation other than that with small load current the first or second resonant capacitor is discharged, and at the instant when the charge in the first or second resonant capacitor becomes zero, the first or second main transistor is turned on for zero voltage switching.

3. The step-up/down voltage chopper according to claim 1, wherein:
   in operation other than that with small load current, in the step-up/down operation immediately before the first main transistor is turned on the first resonant capacitor is discharged, and at the instant when the first resonant capacitor charge becomes zero the first main transistor is turned on for zero voltage switching; and
   in step-up voltage operation the second main diode current flowing through a filter capacitor connected in parallel with the load is once turned off with the first main transistor, immediately before turning on the second main transistor the second and first resonant capacitors are discharged, and at the instant when the charges in the second and first resonant capacitors become zero the first and second main transistors are turned on.

4. A step-up/down voltage chopper, wherein:
   a first series circuit having a first main transistor and a first main diode and a second series circuit having a first auxiliary circuit and a first auxiliary diode are connected in parallel with a DC input voltage circuit, a first resonant reactor is connected between the juncture between the first main transistor and the first main diode in the first series circuit and the juncture between the first auxiliary transistor and the first auxiliary diode in the second series circuit, and a first resonant capacitor and a first inversely conductive diode are connected between the collector and the emitter of the first main transistor;
   a third series circuit having a second main diode and a second main transistor and a fourth series circuit having a second auxiliary diode and a second auxiliary transistor are connected in parallel with a filter capacitor which is connected in parallel with the load, and a second resonant reactor is connected between the juncture between the second main diode and the second main transistor in the first series circuit and the juncture between the second auxiliary diode and the second auxiliary transistor in the second series circuit;
   a second resonant capacitor and a second inversely conductive diode are connected between the collector and the emitter of the second main transistor; and
   a filter reactor is connected between the juncture of the first main transistor and the first main diode in the third series circuit and the juncture between the second main diode and the second main transistor in the fourth series circuit.

5. The step-up/down voltage chopper according to claim 4, wherein in operation other than that with small load current the first and second main transistors are turned off with execution of a soft switching operation based on zero voltage switching caused with the a shift of the collector currents to the first and second resonant capacitors, respectively.

6. The step-up/down voltage chopper according to claim 4, wherein in operation other than that with small load current the first resonant capacitor is discharged by turning on the first auxiliary transistor, and at the instant when the charge in the first auxiliary transistor becomes zero the first main transistor is turned on for zero voltage switching.

7. The step-up/down voltage chopper according to claim 4, wherein in operation other than with small load current at the stepping-up voltage operation the current flowing into the filter capacitor is once turned off with the first main transistor by zero voltage switching, and right before turning on the first and second main transistors the first and second auxiliary transistors are turned on to make the charges in the first and second resonant capacitors zero before turning on the first and second main transistors for zero voltage, zero current switching.

8. The step-up/down voltage chopper according to claim 4, wherein in operation other than that with small load the step-down voltage operation is executed with on-off operation of the first auxiliary transistor for hard switching, and the step-up voltage operation is executed with on-off operation of the second auxiliary transistor for hard switching.

* * * * *